US010182602B2

(12) United States Patent
Andersen et al.

(10) Patent No.: US 10,182,602 B2
(45) Date of Patent: Jan. 22, 2019

(54) HUNTING VEST WITH A GAME CALL POUCH BUILT INTO A POCKET

(71) Applicant: Cabela's LLC, Sidney, NE (US)

(72) Inventors: Tyson Ray Andersen, Sidney, NE (US); Kurt Alan Grove, Sidney, NE (US); Andy Hoban, Dalton, NE (US); Curtis McCormick, Gurley, NE (US); Matthew Richards, Sidney, NE (US); Jordan Roche, Sterling, CO (US)

(73) Assignee: CABELA'S LLC, Sidney, NE (US)

( * ) Notice: Subject to any disclaimer, the term of this patent is extended or adjusted under 35 U.S.C. 154(b) by 207 days.

(21) Appl. No.: 15/050,790

(22) Filed: Feb. 23, 2016

(65) Prior Publication Data

US 2017/0238624 A1    Aug. 24, 2017

(51) Int. Cl.
*A41D 13/00* (2006.01)
*A41D 27/20* (2006.01)
*A41D 1/04* (2006.01)
*A01M 31/00* (2006.01)

(52) U.S. Cl.
CPC ....... *A41D 13/0012* (2013.01); *A01M 31/004* (2013.01); *A41D 1/04* (2013.01); *A41D 27/20* (2013.01); *A41D 27/202* (2013.01); *A41D 2600/108* (2013.01)

(58) Field of Classification Search
CPC .................. A41D 13/0012; A41D 1/04; A41D 2600/108; A41D 27/20; A41D 27/201; A41D 27/202; A41D 27/205; A01M 31/004; A45F 5/00; A45F 5/02; A45F 3/04; A45F 2200/05; H04R 2201/023; A41B 13/103

See application file for complete search history.

(56) References Cited

U.S. PATENT DOCUMENTS 1,088,891 A * 3/1914 Filson ...................... A41D 1/04
2/115
2,853,709 A * 9/1958 Peterson ............ A41D 13/0012
2/51

(Continued)

*Primary Examiner* — Jameson Collier
*Assistant Examiner* — Jocelyn Bravo
(74) *Attorney, Agent, or Firm* — Pillsbury Winthrop Shaw Pittman LLP (57) ABSTRACT

A pocket may be attached to a front surface of a hunting vest. The pocket may have a pocket flap that, when released by a zipper, rotates about a lower edge of the pocket flap attached to the front surface of the hunting vest. The pocket flap may rotate between a substantially vertical position when the pocket is closed and a substantially horizontal position when the pocket is open. When the pocket is open and the pocket flap is in the horizontal position, one or more game calls stored in a corresponding one or more game call pouches may be accessed by the hunter with a single hand. Each game call pouch may have a first aperture for inserting and removing the game call and a second different aperture allowing the hunter to pull a striker against the game call to produce a desired sound. A sound passing aperture, opposite the game call pouch, may allow sound from the game call to exit the pocket. A sound passing mesh may cover each sound passing aperture to keep the game call(s) and striker(s) in the pocket, while keeping leaves and dirt out of the pocket.

20 Claims, 6 Drawing Sheets

FRONT OF A HUNTING VEST WITH CLOSED POCKET

OPEN POCKET WITH TWO POT/GAME CALL POUCHES (56) References Cited

U.S. PATENT DOCUMENTS

| | | | | |
|---|---|---|---|---|
| 3,337,101 | A * | 8/1967 | Tombari | A41D 27/20 2/102 |
| 4,637,075 | A * | 1/1987 | Ingrisano | A41D 13/0012 2/102 |
| 6,883,693 | B2 * | 4/2005 | Han | A45C 13/36 224/245 |
| 2002/0121322 | A1 * | 9/2002 | Seamon | A45C 1/024 150/113 |
| 2007/0226871 | A1 * | 10/2007 | Hood | A41D 1/002 2/69 |
| 2011/0000944 | A1 * | 1/2011 | Hood | A41D 27/20 224/576 |
| 2011/0010818 | A1 * | 1/2011 | Hood | A41D 27/20 2/102 |
| 2012/0030861 | A1 * | 2/2012 | Miller | A41D 1/08 2/221 |
| 2012/0244768 | A1 * | 9/2012 | Oehlert | B63C 9/11 441/106 |

* cited by examiner

POT CALL WITH STRIKER

HUNTING VEST WITH A GAME CALL POUCH BUILT INTO A POCKET

FIELD OF THE INVENTION

The present invention generally relates to a hunting vest with a pocket. The pocket may have a pocket flap that may be released by a zipper and rotated from a vertical position to a horizontal position. A hunter may access and use one or more game calls stored in one or more corresponding game call pouches mounted on an inside surface of the pocket flap when the pocket flap is in the horizontal position.

BACKGROUND OF THE INVENTION

Hunters have long used game calls to attract wild game by mimicking the sounds of animals. Many different types of game calls are known, having various shapes, constructed of many different types of materials and having different techniques for producing different sounds.

One particular type of game call is a pot call. Pot calls may be any desired shape, but are typically shaped as a short hollow cylindrical. Pot calls may be made of any type of material, but are typically made of wood. A top surface (a working surface) of the pot call may be oval shaped and made of any desired material, such as wood, slate or metal (such as aluminum). A striker, typically made of wood and shaped like a wand, may be pulled across the top surface of a pot call to produce a desired sound. Specific materials may be selected to construct the pot call and the striker so that desired sounds may be produced.

A skilled hunter is able to pull the striker along an outer edge of the pot call to produce higher pitched sounds and pull the striker near the center of the pot call to produce lower pitched sounds. Also, varying the pressure and speed of the striker against the pot call may also alter the sound. Using these techniques, the hunter may be able to produce sounds that are very similar to the sounds animals make in the wild. As specific examples, a hunter may know how to pull the striker against the game call to make clucks, purrs, kee-kees, yelps, cuts and cackle, of varying loudness, that sound like sounds from a turkey. Creating these sounds may be used to attract a turkey.

However, using the pot call typically takes two hands, one hand to hold the pot call and the other hand to pull the striker against the pot call. Applicant has discovered that it would be desirable to have a method of using the pot call and the striker to produce a desired sound that only required the hunter to use one hand.

Another problem with using the pot call is that the pot call and the striker are fairly small and easily lost in the woods while hunting. Applicant has discovered that it would be desirable to have a method for easily storing, retaining and protecting the pot call and the striker so that neither is lost while hunting.

SUMMARY OF THE INVENTION

The present invention provides a hunting vest that may be worn by a hunter. The hunting vest may have a pocket in front (opposite the hunter's chest, stomach or waist area) that includes a zipper and a pocket flap. A bottom edge of the pocket flap may be attached to a front of the vest so that the pocket flap may pivot around the bottom edge to rotate the pocket flap between a substantially vertical position (when the pocket is zipped closed) and a substantially horizontal position (when the pocket is zipped open).

One or more game call pouches (and most preferably two game call pouches), which may be pot call pouches, may be attached to an inside surface of the pocket flap. Thus, when the pocket is zipped open and the pocket flap is rotated about a bottom edge to a horizontal position, the hunter may easily access one or more game calls held in a corresponding one or more game call pouches.

Each game call pouch may comprise a binding, permanently attached to the inside surface of the pocket flap, shaped as desired to retain a game call. The shape may be, as non-limiting examples, a U-shape or a hollow semicircle shape.

Each game call pouch may also comprise a band, which is preferably elastic and may stretch more than 5%, but less than 100%, of its original length. Each end of the elastic band may be attached to the inside surface of the pocket flap on or near one of the upper parts of the U-shape binding or the hollow semicircle shape binding.

A first aperture may be formed between the elastic band and the inside surface of the pocket flap that allows a game call to be inserted and removed from the game call pouch.

A second aperture, different from the first aperture, may be formed by the binding and the elastic band, configured to allow a striker to be rubbed against the game call by the hunter while the game call is in the game call pouch.

The pocket flap may include a backing, which may be made of a light-weight material such as, as non-limiting examples, paper or plastic, to increase a rigidity of the pocket flap so that the hunter may press the striker against the game call without distorting the shape of the pocket flap and thereby losing control over the position of the game call.

A sound passing aperture may extend through the outside surface of the pocket flap, opposite the game call pouch, configured to channel a sound from the game call out of the game call pouch. In preferred embodiments, a sound passing mesh may be place over each sound passing aperture to prevent items (game call(s) or striker(s)) in the pocket from falling out of the pocket and for items or detritus (leaves, branches, dirt, etc.) outside the pocket from entering the pocket.

In some embodiments, one or more cords may have one end attached to the front of the vest and the other end attached to the pocket flap and configured to support the pocket flap when the pocket flap is in the substantially horizontal position.

The above features and advantages of the present invention will be better understood from the following detailed description taken in conjunction with the accompanying drawings.

DETAILED DESCRIPTION

The present inventions will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

Figure 6:
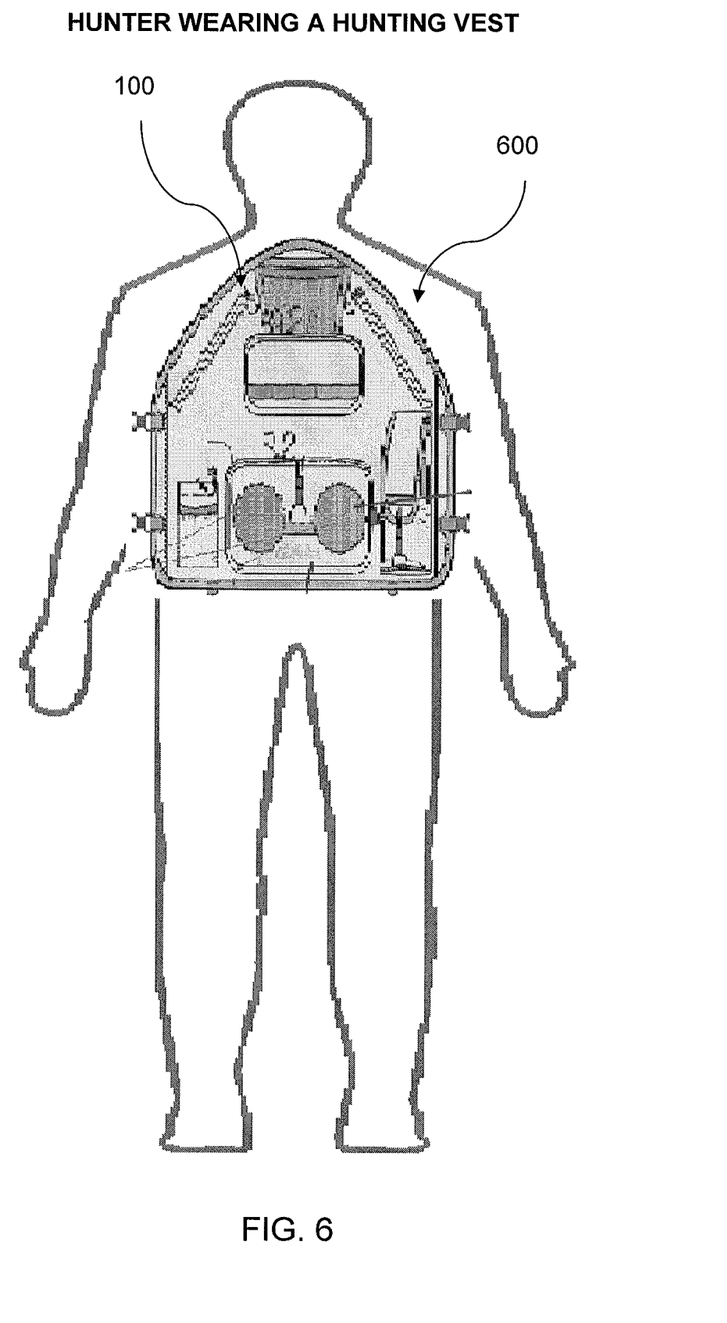
FIG. 6 is an illustration of a hunter wearing the hunting vest.

FIG. 6 illustrates an embodiment of the invention with a hunter 600 wearing a hunting vest 100. While the invention will generally be described using hunting vest 100 embodiments in this specification, it should be understood that other embodiments of the invention may not use a hunting vest 100 and may instead use, as non-limiting examples, an article of clothing or a garment, such as a coat, a jacket, a sweater, a shirt or a vest.

Figure 1:
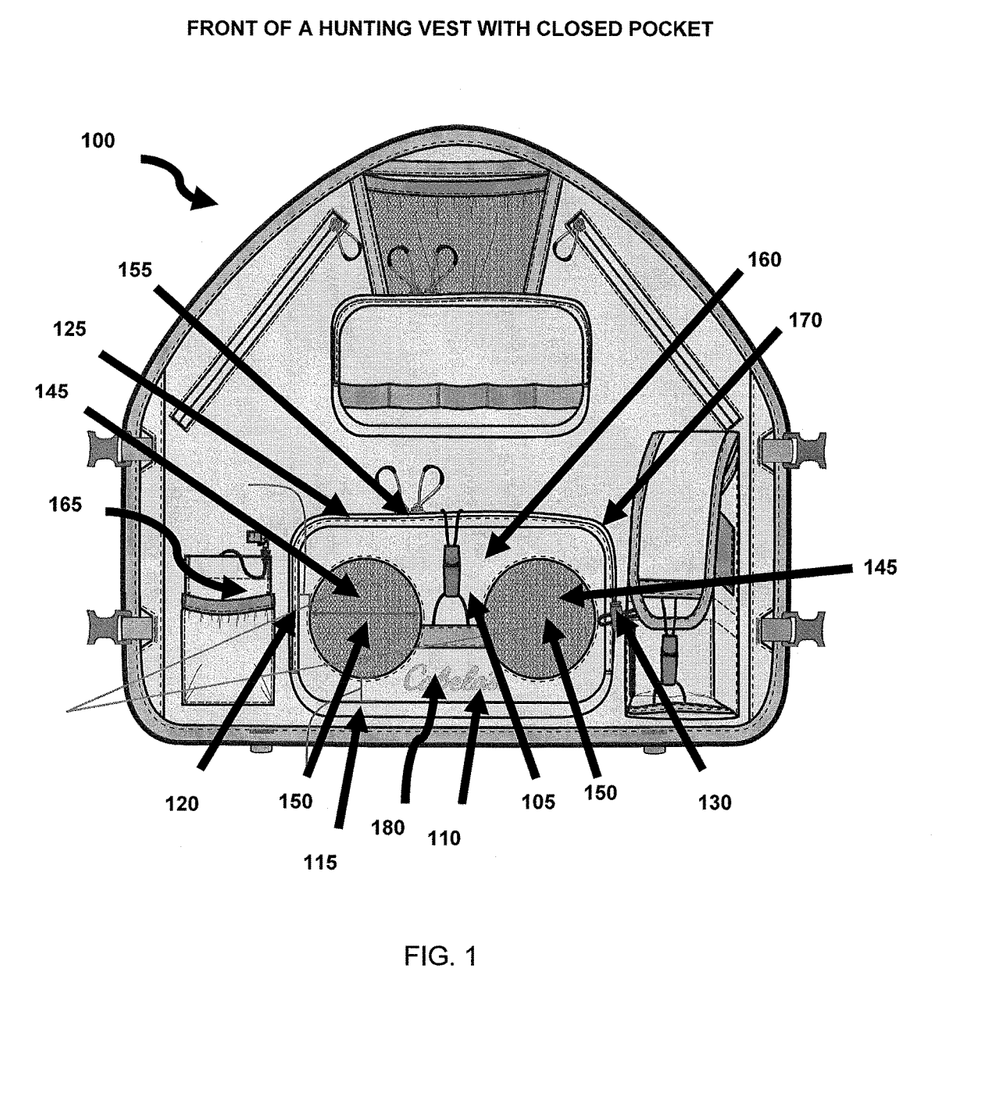
FIG. 1 is an illustration of a front of a hunting vest with a closed pocket.

The hunting vest 100 may be worn by the hunter 600 and have a front that covers a portion of the hunter's chest, stomach or waste area and a back that covers a portion of the hunter's back. The hunting vest 100 in FIGS. 1 and 6 illustrate the front of the hunting vest 100. The outer layer fabric may be made, as a non-limiting example, of a durable woven polyester cotton blended fabric that is printed or solid in color. The lining fabric is preferably made of 150D 100% polyester woven fabric that is a solid color.

As shown in FIG. 1, a pocket 180 may be permanently attached to the front of the hunting vest 100. The pocket 180 may be attached to the front of the hunting vest 100 by any desired method. As a non-limiting example, the pocket 180 may be sewn or stitched to the front of the hunting vest 100.

The pocket 180 may have any desired width (distance the pocket 180 extends out from the front of the hunting vest 100), height (vertical distance of the pocket 180 while the pocket 180 is closed) and length (horizontal distance of the pocket 180). In a preferred embodiment, the pocket 180 may be about two inches in width, about six inches in height and about 10 inches in length.

In a non-limiting example, the pocket 180 may be formed using a loop of material 170 (which may be created from one or more pieces or sections of material stitched together), a pocket flap 105 and a portion of the front of the vest 100. The loop of material 170 may be used to form a right side, a top side, a left side and a bottom side of the pocket. The width of the loop of material 170 may be adjusted as desired to adjust the width of the pocket, but the loop of material 170 is preferably the same width along the entire length of the loop of material 170. In a non-limiting example, the width of the loop of material 170 may be about two inches wide, which would produce a pocket of about two inches in width.

The length of the loop of material 170 may also be adjusted as desired to adjust the length of the periphery of the pocket 180. The pocket 180 may be made in any desired shape and in any desired size using this method. In a non-limiting example, the length of the loop of material 170 may be about 32 inches so that a rectangular-shaped pocket 180 of about six inches in height and 10 inches in length may be created. This size pocket 180 accommodates two standard sized game call pouches 210. The size of the pocket 180 may be increased for addition game call pouches 210 and/or additional storage area or decreased for fewer game call pouches 210 and/or to create a smaller pocket.

The loop of material 170 may include: 1) a zipper 155, running along some portion, preferably over half, of the length of the loop of material 170, 2) an inside fringe and 3) an outside fringe. With the zipper 155 preferably on top, the outside fringe may be permanently attached along an outer edge of the pocket flap 105 and the inside fringe may be permanently attached to the front of the hunting vest 100. Thus, the loop of material 170, the pocket flap 105 and a portion of the front of the hunting vest 100 (or an inside part of the pocket) may define the pocket 180. This configuration allows the pocket 180 to be opened and closed with the zipper 155 and for the right edge 120, top edge 125 and left edge 130 of the pocket flap 105 to be disconnected from the front of the hunting vest 100.

In a preferred embodiment, the zipper 155 may run along a right side, a top side and a left side of the pocket 180 so that the pocket 180 may be fully opened with only the bottom edge 115 of the pocket flap 105 still permanently attached to the front of the hunting vest 100. The bottom edge 115 of the pocket flap 105 may be attached to the front of the hunting vest 100 directly or the bottom edge 115 of the pocket flap 105 may be attached to the front of the hunting vest 100 via the loop of material 170 between the front of the vest 100 and the pocket flap 105.

When the zipper 155 is closed, the pocket flap 105 will be in a substantially vertical position 165, shown in FIGS. 1 and 6 and any items, such as a pot call 200 and/or striker 400, in the pocket 180 will be protected and safely stored by the pocket 180.

Figure 2:
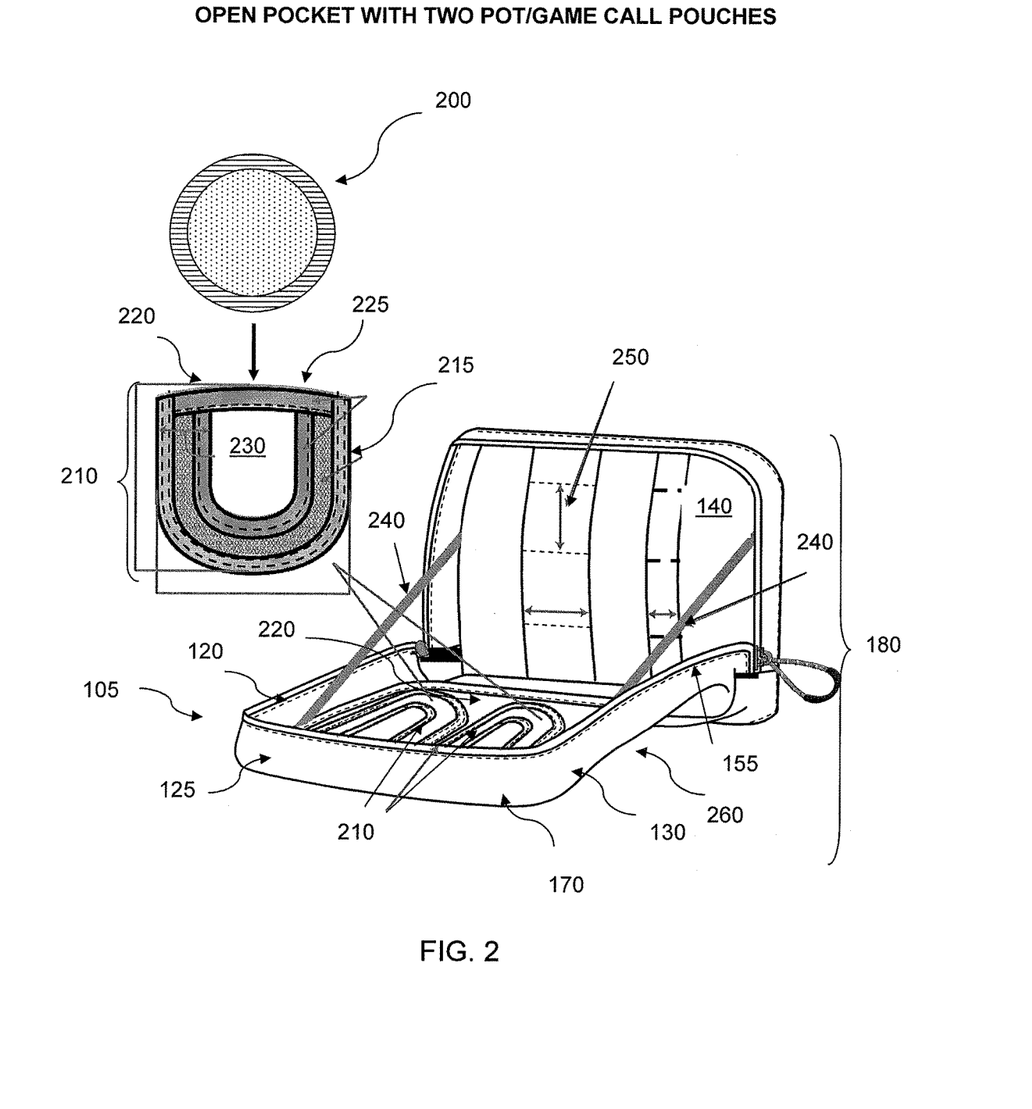
FIG. 2 is an illustration of an open pocket with two game call or pot call pouches.
Figure 3:
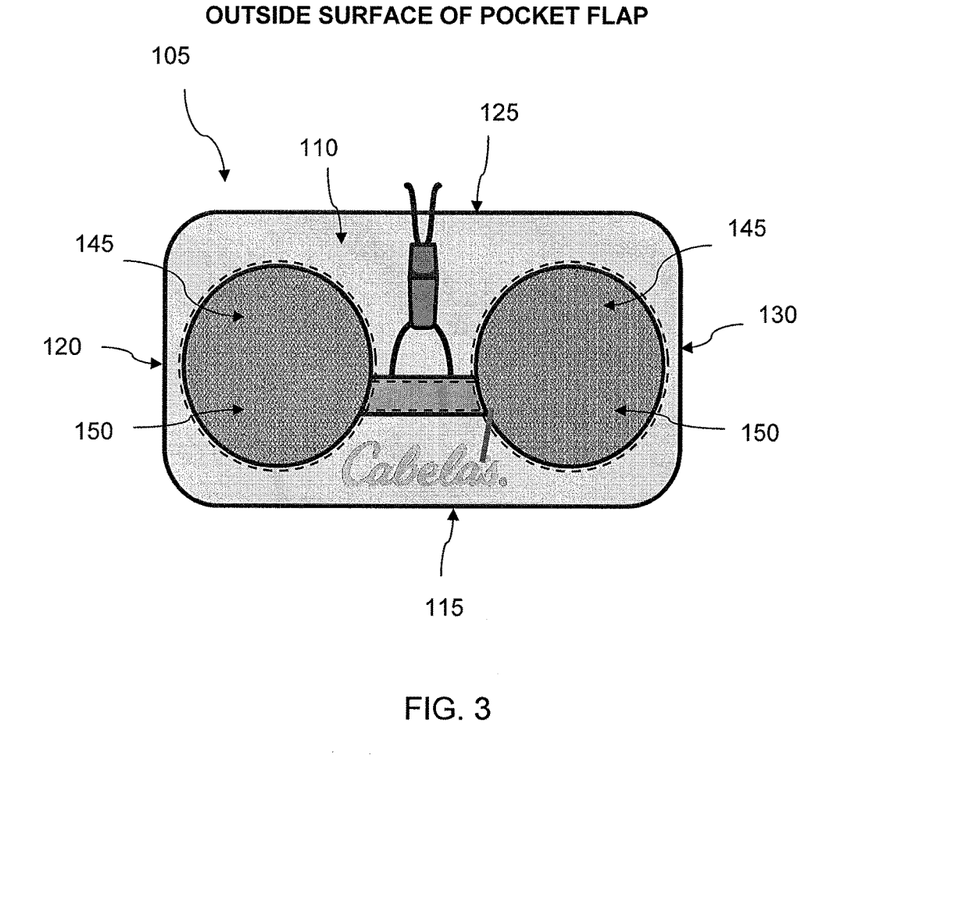
FIG. 3 is an illustration of an outside surface of a pocket flap of a pocket.

When the zipper 155 is open and the zipper 155 runs the length of the right side, the top side and the left side of the pocket 180 and the bottom edge 115 of the pocket flap 105 is permanently attached (either directly or indirectly) to the front of the hunting vest 100, the pocket flap 105 may be swung, rotated, pivoted, lowered, raised and/or moved around or about the bottom edge of the pocket flap 105 between a substantially vertical position 165 and a substantially horizontal position 260. FIG. 1 illustrates the pocket flap 105 in a substantially vertical position 165 while FIG. 2 illustrates the pocket flap 105 in a substantially horizontal position 260.

Figure 5:
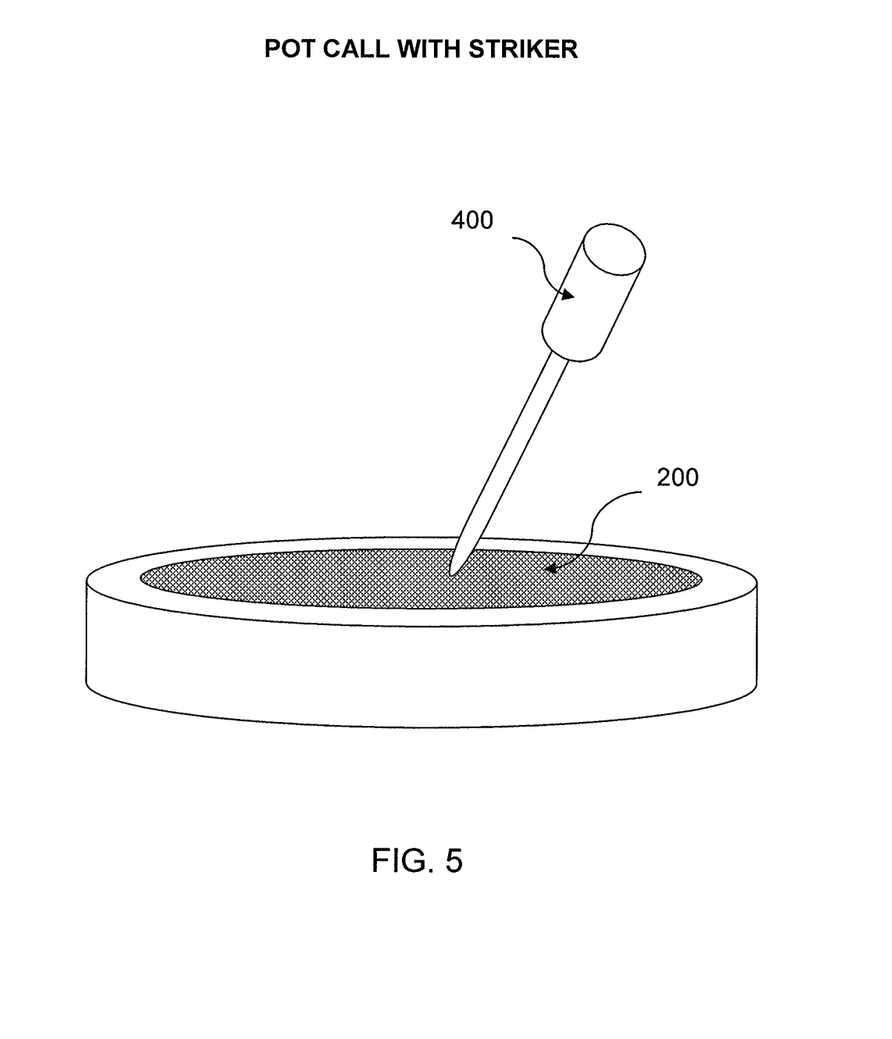
FIG. 5 is an illustration of a pot call with a striker.

When the pocket flap 105 is in a substantially horizontal position 260 (the zipper 155 is open and the pocket flap 105 has been rotated about the bottom edge 115 of the pocket flap 105 to the substantially horizontal position 260), one or more (and preferably two) game call pouches 210 attached to an inside surface 220 of the pocket flap 105 may become accessible to the hunter 600. Any type of game call 200 may be carried or positioned in the game call pouch 210 and, as a non-limiting example, the game call 200 may be a pot call as illustrated in FIG. 5.

Each game call pouch 210 attached to the inside surface 220 of the pocket flap 105 may comprise a binding 215 configured to restrain and hold in place an outer edge of the game call 200 during use by the hunter 600. The binding 215 may be permanently attached to the inside surface 220 of the pocket flap 105 and is preferably elastic so as to stretch to allow a game call 200 to be inserted into the game call pouch 210 and to stretch to allow the game call 200 to be removed from the game call pouch 210. The binding 215 is also preferably elastic to contract, after a game call 200 is inserted, to snugly hold the game call 200 in position in the game call pouch 210 during use by the hunter 600.

The binding 215 of each game call pouch 210 is preferably shaped to match some portion of the outer edge of a game call 200 being used by the hunter 600.

Since many game calls 200 are round, the game call pouch 210 may be U-shaped or shaped as a hollow semicircle. The width of the U-shaped binding 215 or the hollow semicircle binding 215 may be slightly larger than the diameter of the game call 200 to allow the game call 200 to be inserted and removed, yet held firmly in place during the use of the game call 200 by the hunter 600. As a non-limiting example, since many game calls 200 are about four inches in diameter, the width of the U-shaped or hollow semicircle binding 215 may be slightly larger, such as about four and one half inches. In addition, the height of the binding 215 may be any desired length, but in preferred embodiments may be about three and three quarter inches.

Figure 4:
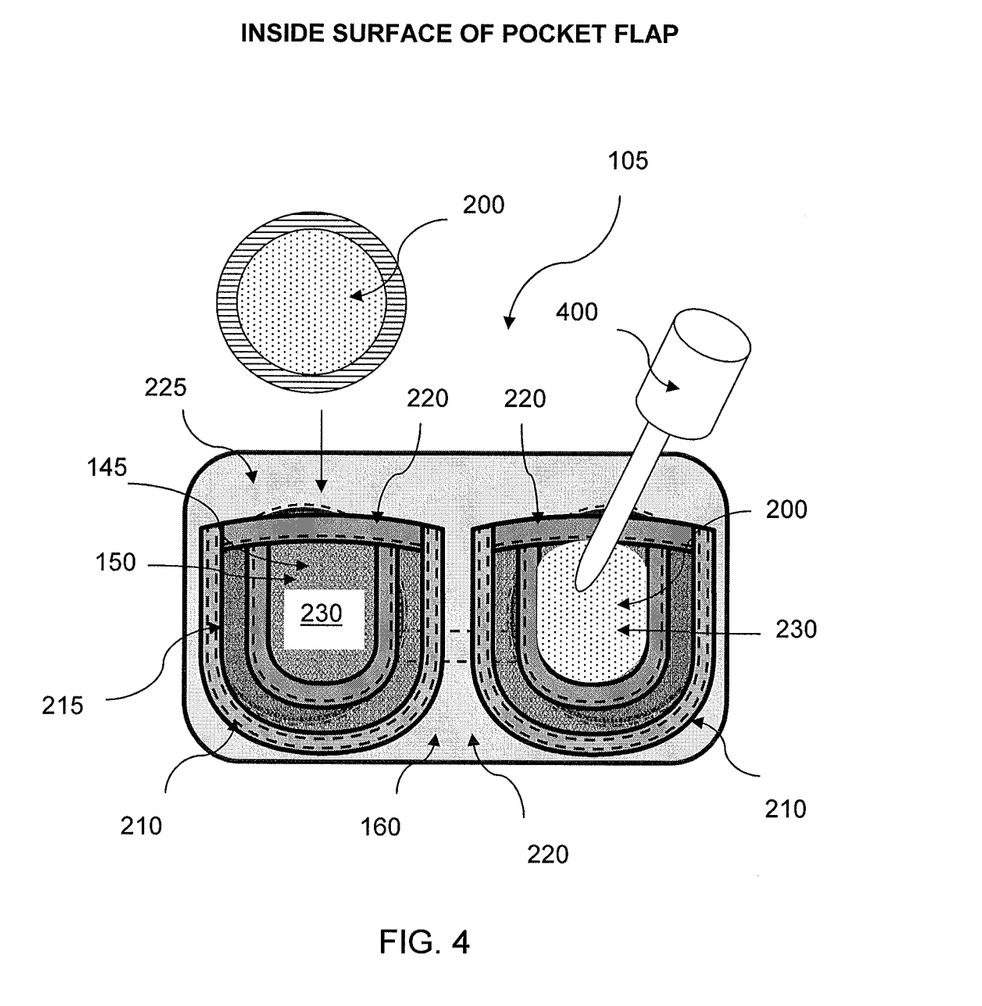
FIG. 4 is an illustration of an inside surface of a pocket flap of a pocket.

Each game call pouch 210 attached to the inside surface 220 of the pocket flap 105 may also comprise a band 220 or a cord, preferably elastic, attached across a top of the U-shaped binding 215 or across a top of the hollow semicircle shaped binding 215 as illustrated in FIGS. 2 and 4. While the ends of the elastic band 220 may be attached to the binding 215 and/or the inside surface 220 of the pocket flap 105, the middle portion of the elastic band 220 may be pulled away from the inside surface 220 of the pocket flap 105. When the middle portion of the elastic band 220 is pulled away from the inside surface 220 of the pocket flap 105, a first aperture 225 may be formed for inserting and removing the game call 200 from the game call pouch 210.

Each binding 215 that is U-shaped or hollow semicircle shaped may be attached to the inside surface 220 of the pocket flap 105 so that the aperture for inserting and removing the game call 200 faces towards the right edge 120, the top edge 125, the left edge 130, the bottom edge 115 or some in between position of the pocket flap 105. In a preferred embodiment, each U-shaped or hollow semicircle shaped binding 215 is attached to the inside surface 220 of the pocket flap 105 so that the aperture, for inserting and removing game calls 200 from the game call pouch 210, faces and is closest to the top edge 125 of the pocket flap 105.

In addition, the elastic band 220 and the binding 215 may define or form a second aperture 230, different from the first aperture 225, that is illustrated in FIGS. 2 and 4. The second aperture 230 may be used by the hunter 600 to pull a striker 400 against the game call 200 to produce a desired hunting call to attract game. The second aperture 230 may be any desired size and as a non-limiting example, may be about one and one quarter inch in width or diameter.

The binding 215 and the elastic band 220 may be made of any durable material. As non-limiting examples, the binding 215 may be made of a 20 mm or 25 mm polyester, nylon, or Polypropylene webbing and the elastic band 220 may be made of 20 mm elastic webbing binding or similar stretch material.

The pocket flap 105 may also comprise a sound passing aperture 145 through the outside surface 110 of the pocket flap 105, opposite the game call pouch 210, configured to channel a sound from the game call 200 out of the game call pouch 210. In preferred embodiments, there is one sound passing aperture 145 opposite each game call pouch 210 attached to the inside surface 220 of the pocket flap 105. This allows the sound from each game call 200 to be channeled out of the game call pouch 210 and the pocket 180.

The bottom surface of many game calls 200, such as pot calls, have sound emitting holes that allow sound to leave the game calls 200 during use. The sound passing aperture 145 is preferably large enough to not block the sound emitting holes in the game call 200, while small enough to prevent the game call 200 from falling through the sound passing aperture 145. The sound passing aperture 145 may be any size, but in preferred embodiments the sound passing aperture 145 is about three inches in diameter.

In preferred embodiments, a sound passing mesh 150 may be used to cover the sound passing aperture 145. There is preferably a sound passing mesh 150 covering each sound passing aperture 145. The mesh 150 may comprise any desired pattern of threads and gaps. The threads and gaps may also be of any desired size. The mesh 150 may be any size, but in preferred embodiments the mesh 150 is the same size as the sound passing aperture 145 and may be, as a non-limiting example, about three inches in diameter.

Larger threads, a tighter pattern and/or smaller gaps in the mesh 150 will provide better protection for the inside of the pocket 180 and for the game call 200, but may hinder the passing of sound from the game call 200 through the sound passing aperture 145. Smaller threads, a looser pattern and/or larger gaps in the mesh 150 will provide less protection for the inside of the pocket 180 and for the game call 200, but will be less likely to hinder the sound from the game call 200 through the sound passing aperture 145. As non-limiting examples, the threads of the sound passing mesh 150 may be made of polyester, nylon, or a blended content open mesh type fabric.

In some embodiments, the pocket flap 105 may comprise a backing 160 to increase the rigidity of the pocket flap 105 without blocking the sound passing aperture 145. The backing 160 may help the pocket flap 105 to retain its shape and the game call 200 in its position as the hunter 600 presses down on a striker 400 against the game call 200. The backing 160 may comprise any material that is preferably light weight, water resistant and increases the rigidity of the pocket flap 105. As non-limiting examples, the backing 160 may be a cardboard insert, a plastic substrate or any other desired material to strengthen the rigidity of the pocket flap 105. The backing 160 may be positioned anywhere between the inside surface 220 of the pocket flap 105 and the outside surface 110 of the pocket flap 105. The pocket flap 105 may be made of, as a non-limiting example, closed cell foam in various thicknesses and/or densities.

One or more cords 240 may have one end attached to the front of the vest 100, possibly via some part of the pocket 180, and the other end attached to the pocket flap 105. The one or more cords 240 may thus support the pocket flap 105 when the pocket flap 105 is in the substantially horizontal position 260. The one or more cords 240 may fold up and stay in the pocket 180 when the pocket 180 is closed or the zipper 155 has closed the pocket 180. The one or more cords 240 may be of any desired length, such as, as a non-limiting example, about four inches long. The cords 240 may be made, as non-limiting examples, of polyester, nylon, or blended content paracord of various thicknesses and lengths.

A striker holder 250 may be permanently attached to the front of the hunting vest 100 inside the pocket 180 or attached to an inside face 140 of the pocket 180 (i.e., opposite the pocket flap 105), configured to hold one or more strikers 400 used on the game call 200. The striker holder 250 may comprise an elastic strip of material attached to the front of the garment and inside the pocket 180, by a plurality of spaced apart stitches as shown in FIG. 2. One or more striker holders 250 may thus be defined and formed by the elastic strip of material and between two neighboring stitches in the plurality of spaced apart stitches. The elastic strip of material and two neighboring stitches may create a tunnel that the striker 400 may be inserted into, thereby securely holding the striker 400 against the front of the hunting vest 100 until the striker 400 is desired to be used by the hunter 600.

Any number of elastic strips of material may be used of any width and of any length. FIG. 2 illustrates two elastic strips of material (striker holders 250) attached vertically to an inside face of the pocket 180. As a non-limiting example, two elastic strips may be attached to the front of the vest 100 on the inside of the pocket 180. Both strips may be the height of the pocket 180, such as six inches, with one strip being two inches wide and the other strip being one inch wide. The spacing of the stitches may be any desired length. As a non-limiting example, the spacing of the stitches may be one inch apart. This configuration may create multiple channels of the elastic strips of material (striker holder 250) between stitches for holding one or more strikers 400. The elastic strips may be made from or use elastic webbing with high-elasticity of various widths. The elastic strips, as examples, are preferably of 25 mm or 38 mm width.

In preparation for use, a hunter 600 may place one or more game calls 200, such as pot calls, in a corresponding one or more game call pouches 210 in the pocket 180. The game call pouches 210 may be permanently attached to an inside surface 220 of a pocket flap 105 of the pocket 180. The hunter 600 may also place one or more strikers 400 in a striker holder 250 mounted to a front surface of the vest 100, preferably in the pocket 180 to prevent the loss of the striker 400.

The hunter 600 may wear the vest 100, preferably with the front of the vest 100, with the pocket 180, substantially covering the hunter's chest, stomach or waist area as shown in FIG. 6. The hunter 600, with the zipper 155 closed on the pocket 180, may move to any desired hunting location. Once at a desired hunting location, the hunter 600 may unzip the zipper 155 of the pocket 180 thereby releasing a left side, a top side and right side of the pocket 180 and rotate or pivot the pocket flap 105 about or around a bottom edge 115 of the pocket flap 105 attached to the front of the hunting vest 100 so that the pocket flap 105 is in a substantially horizontal position 260 as shown in FIG. 2.

One or more cords 240 extending from the front of the vest 100 to the pocket flap 105 may hold the pocket flap 105 in the horizontal position 260. The pocket flap 105 may also include a backing 160 to help support the one or more game calls 200 during use by the hunter 600. Since the game call 200 is supported by the game call pouch 210, the hunter 600 only needs one hand to rub the striker 400 against the game call 200 as shown in FIGS. 4 and 5. In other words, the hunter 600 does not have to hold the game call 200 in one hand and the striker in another hand to make the game call 200 produce a desired sound.

The hunter 600 may remove a striker 400 from a striker holder 250 attached to the front of the vest 100 and inside the pocket 180. The hunter 600 may hold the striker in one hand and rub the striker 400 against the game call 200 that is supported by the game call pouch 210 to produce a desired sound. The sound from the game call 200 may pass through a sound passing aperture 145 and a sound passing mesh 150. One advantage of the present invention is that the game call 200 may be used with one hand (the hand holding the striker 400) as the game call 200 is held in place by the game call pouch 210. This allows the hunter 600 to use the other hand as desired, such as holding a rifle.

When finished using the game call 200, the hunter 600 may return the striker 400 to the striker holder 250 and zip the zipper 155 of the pocket 180 closed so the pocket flap 105 is back in the vertical position 165 and the pocket 180 is closed. The hunter 600 may then change locations without fear of losing either the game call(s) 200 or the striker(s) 400, as both are safely retained in the pocket 180.

Other embodiments and uses of the above inventions will be apparent to those having ordinary skill in the art upon consideration of the specification and practice of the invention disclosed herein. It should be understood that features listed and described in one embodiment may be used in other embodiments unless specifically stated otherwise. The specification and examples given should be considered exemplary only, and it is contemplated that the appended claims will cover any other such embodiments or modifications as fall within the true scope of the invention.

The invention claimed is:

1. A hunting vest comprising:
a vest configured to be worn by a user;
a pivotal pocket comprising an inside surface, an outside surface and a bottom edge, wherein the bottom edge of the pivotal pocket is permanently attached to a front of the vest so that the pivotal pocket is configured to pivot about the bottom edge between a substantially vertical position and a substantially horizontal position;
a pot call pouch comprising an elastic binding configured to restrain an outer edge of a pot call during use,
wherein the elastic binding forms a first aperture configured to allow the user to insert and remove the pot call from the pot call pouch,
wherein the elastic binding forms a second aperture, different from the first aperture, configured to allow a striker to be rubbed against the pot call, during use, by the user, and
wherein the elastic binding of the pot call pouch is permanently attached to the inside surface of the pivotal pocket such that, when in use, the user accesses and uses the pot call stored in the pot call pouch and held in place by the elastic binding when the pivotal pocket is in the substantially horizontal position;
a sound passing aperture formed through the outside surface of the pivotal pocket opposite the pot call pouch configured to channel a sound from the pot call out of the pot call pouch when the pot call is in use by the user; and
a cord, with a first end attached to the front of the vest and a second end attached to the pivotal pocket, wherein the cord is configured to support the pivotal pocket when the pivotal pocket is in the substantially horizontal position.

2. The hunting vest of claim 1, further comprising a sound passing mesh configured to cover the sound passing aperture.

3. The hunting vest of claim 1, further comprising a second pot call pouch and a second sound passing aperture opposite the second pot call pouch.

4. The hunting vest of claim 1, further comprising a zipper configured to connect and disconnect a left side, a top side and a right side of the pivotal pocket with the front of the vest.

5. The hunting vest of claim 1, wherein the pivotal pocket further comprises a backing that is configured to increase a rigidity of the pivotal pocket without blocking the sound passing aperture.

6. The hunting vest of claim 1, further comprising: a striker holder permanently attached to the front of the vest inside the pivotal pocket,
wherein the striker holder is configured to hold the striker used by the user on the pot call.

7. An article of clothing comprising:
a garment configured to be worn by a user;
a pivotal pocket comprising an inside surface, an outside surface and a bottom edge,
wherein the bottom edge of the pivotal pocket is permanently attached to a front of the garment so that the pivotal pocket is configured to rotate about the bottom edge of the pivotal pocket between a substantially vertical position and a substantially horizontal position;

a game call pouch comprising a binding configured to hold in place an outer edge of a game call and an elastic band extending horizontally across the top of the binding,     wherein the elastic band and the inside surface of the pivotal pocket define a first aperture configured to allow the user to insert and remove the game call from the game call pouch,     wherein the elastic band and the U-shaped-binding define a second aperture, different from the first aperture, configured to allow a striker to be rubbed against the game call during use, by the user, and     wherein the binding of the game call pouch is permanently attached to the inside surface of the pivotal pocket such that, when in use, the user accesses and uses the game call stored in the game call pouch and held in place by the binding when the pivotal pocket is in the substantially horizontal position; and     a sound passing aperture formed through the outside surface of the pivotal pocket opposite the game call pouch configured to channel a sound from the game call out of the game call pouch when the game call is in use by the user.

8. The article of clothing of claim 7, further comprising a sound passing mesh configured to cover the sound passing aperture.

9. The article of clothing of claim 7, further comprising a second game call pouch and a second sound passing aperture opposite the second game call pouch.

10. The article of clothing of claim 7, further comprising a zipper configured to connect and disconnect a left edge, a top edge and a right edge of the pivotal pocket with the front of the garment.

11. The article of clothing of claim 7, wherein the pivotal pocket further comprises a backing that is configured to increase a rigidity of the pivotal pocket without blocking the sound passing aperture.

12. The article of clothing of claim 7, further comprising: a striker holder permanently attached to the front of the garment inside the pivotal pocket,     wherein the striker holder is configured to hold the striker used by the user on the game call.

13. The article of clothing of claim 7, further comprising: one or more cords, with a first end of each cord attached to the front of the garment and a second end of each cord attached to the pivotal pocket,     wherein the one or more cords are configured to support the pivotal pocket when the pivotal pocket is in the substantially horizontal position.

14. An article of clothing comprising:

a garment configured to be worn by user; and a pivotal pocket attached to a front of the garment, the pivotal pocket comprising: an inside surface, an outside surface, and a bottom edge, the pivotal pocket configured to be rotatable about the bottom edge of the pivotal pocket between a substantially vertical position and a substantially horizontal position, wherein the bottom edge of the pivotal pocket is permanently attached to the front of the garment or a bottom edge of the pocket, wherein the pivotal pocket comprises:

a game call pouch disposed on an inside surface of the pivotal pocket such that, when in use, the user accesses and uses a game call stored in the game call pouch when the pivotal pocket is in the substantially horizontal position,     the game call pouch configured to allow the game call to be easily inserted by the user, configured to allow an outer edge of the game call to be held in place in the game call pouch during use by the user, and configured to allow the game call to be easily removed from the game call pouch by user;

a sound passing aperture opposite the game call pouch and formed through the outside surface of the pivotal pocket; and     a zipper configured to connect and disconnect a top edge of the pivotal pocket with the front of the garment.

15. The article of clothing of claim 14, wherein the game call pouch comprises: a piece of material shaped like the outer edge of the game call, attached to the inside surface of the pivotal pocket and configured to receive the game call.

16. The article of clothing of claim 14, wherein the game call pouch comprises:

a piece of material permanently attached to the inside surface of the pivotal pocket; and a cord attached to, and extending across, a top of the piece of material.

17. The article of clothing of claim 14, wherein the game call pouch comprises:

a piece of elastic material attached to the inside surface of the pivotal pocket; and an elastic band attached to, and extending across, a top of the piece of elastic material, to thereby define a first aperture, defined by the elastic band and the inside surface of the pivotal pocket, configured to allow the user to receive and remove the game call from the game call pouch, the elastic band and the piece of elastic material further defining a second aperture configured to allow a striker to be rubbed against the game call by the user.

18. The article of clothing of claim 14, further comprising a sound passing mesh covering the sound passing aperture, the sound passing mesh configured to channel a sound from the game call out of the game call pouch when the game call is in use by the user.

19. The article of clothing of claim 14, wherein the pocket further comprises:

a loop of material, comprising the zipper, an inside fringe and an outside fringe, wherein the outside fringe is permanently attached along an outer edge of the pivotal pocket and the inside fringe is permanently attached to the front of the garment, wherein the loop of material, the pivotal pocket and a portion of the front of the garment thereby define a periphery of the pocket, and wherein the pocket is configured to be opened and closed with the zipper.

20. The article of clothing of claim 14, further comprising: an elastic strip of material attached to the front of the garment, and inside the pocket, by a plurality of spaced apart stitches,     wherein a striker holder is thereby defined by the elastic strip of material and between two neighboring stitches in the plurality of spaced apart stitches.

\* \* \* \* \*